April 26, 1960  L. PÉRAS  2,934,355
RESILIENT REAR WHEEL SUSPENSION ARRANGEMENT FOR VEHICLES
Filed Dec. 10, 1956  2 Sheets-Sheet 2

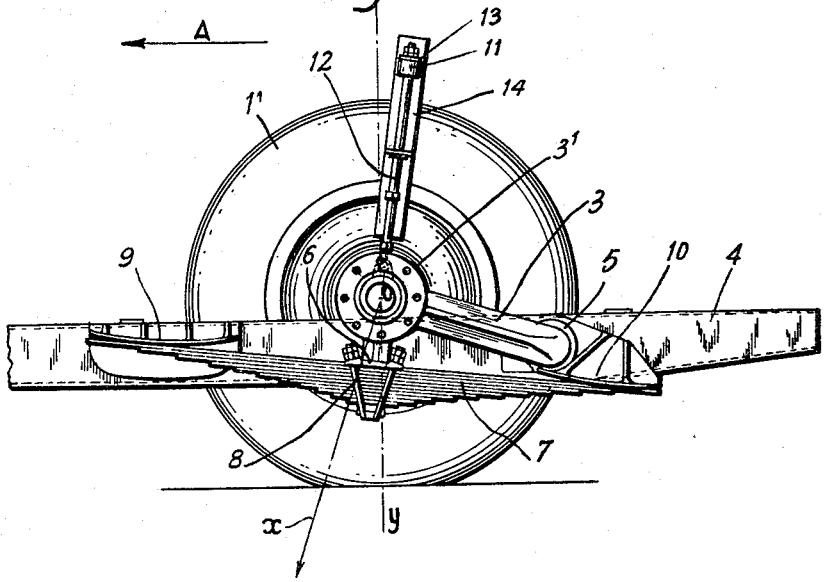
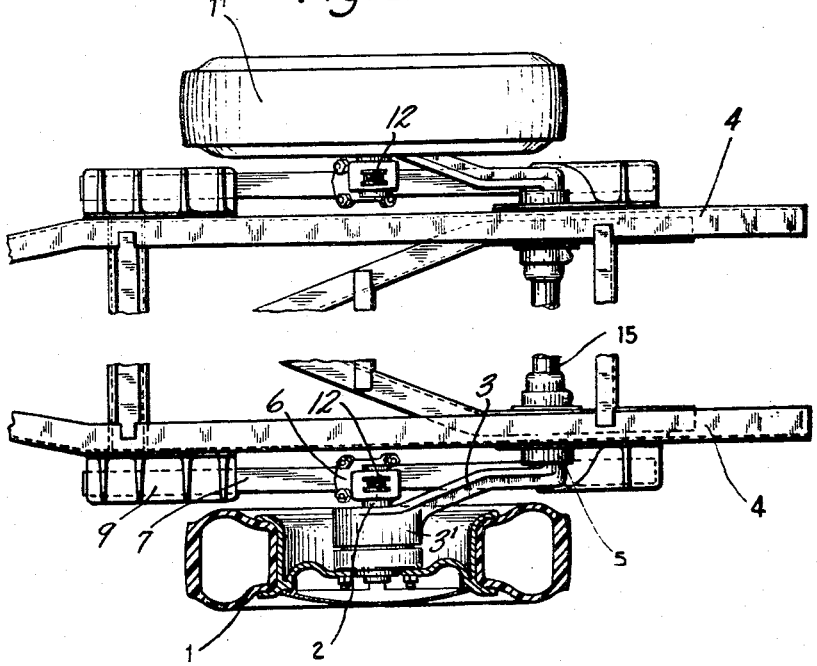

United States Patent Office 2,934,355
Patented Apr. 26, 1960

2,934,355

RESILIENT REAR WHEEL SUSPENSION ARRANGEMENT FOR VEHICLES

Lucien Péras, Billancourt, France, assignor to Regie Nationale des Usines Renault, Billancourt, France Application December 10, 1956, Serial No. 627,280

Claims priority, application France December 12, 1955

3 Claims. (Cl. 280—124)

The invention relates to a rear suspension device for vehicles, more particularly applicable to vehicles having independently suspended wheels. It makes it possible, by the arrangement of the members of the suspension, to obtain a shock-absorbing effect in the wheel-carrying assembly, diminishing the amount of wear on the tires on the one hand and reducing vertical accelerations on the other hand, thus reducing the shocks transmitted to the chassis and the body of the vehicle.

The suspension device is essentially constituted, in the case of each rear wheel, by an arm which is articulated to the chassis, is arranged longitudinally of the side-members and is forwardly directed, the said arm carrying the stub axle of the wheel and being provided with a collar which surrounds the stub axle and is connected at its lower portion to a shoe carrying the variable-flexibility suspension leaf spring whose ends bear on the lower faces of specially profiled abutments carried by the chassis. The point of articulation of the wheel-carrying arm to the chassis is arranged rearwardly of the center of the wheel and lower than the said center in order to fulfill certain conditions of operation which will be explained hereinafter.

The collar of the arm surrounding the stub axle is also connected at its upper portion to a play-limiting means composed for example of an adjustable rod and a rubber abutment bearing against the body of the vehicle.

The invention is also concerned with certain details of embodiment which will be described more particularly hereinafter.

In the accompanying drawings:

Fig. 1 is a side view of the rear portion of the chassis provided with a rear wheel suspension arrangement according to the invention;

Fig. 2 is a plan view partly in section of the same chassis;

Figure 3:
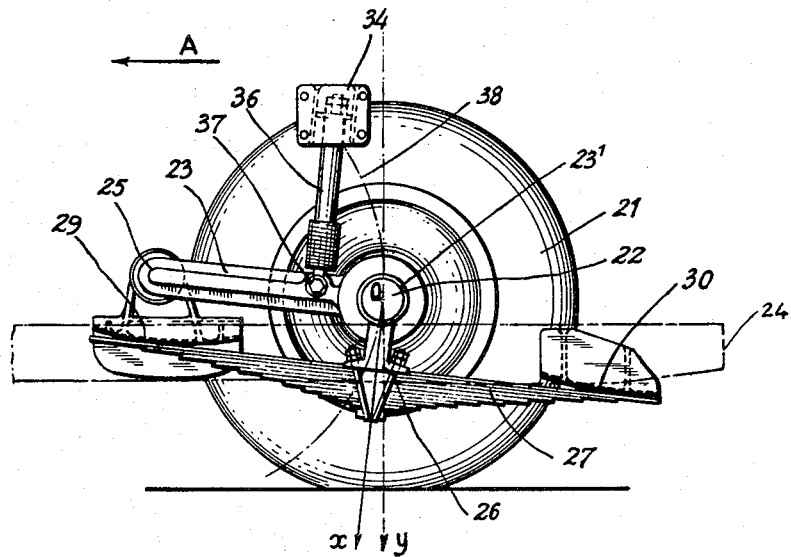
Fig. 3 is an elevational view of a modified embodiment and is taken along line III—III of Fig. 4.

Referring now to Figs. 1 and 2, it will be seen that a rear wheel 1 is supported by the stub axle 2 fixed to the end of an arm 3 which is arranged longitudinally of a chassis or frame side-member and is articulated to a support 5 of the chassis 4. Wheel 1 is shown in section in Fig. 2 and is not shown in Fig. 1 in order to show the suspension without obstruction of the view by the wheel, it being understood that Fig. 1 is simply a side view of Fig. 2 with the wheel 1 removed. As can be seen in Fig. 2 the opposite rear wheel 1' is supported in a similar manner.

A collar $3^1$ surrounding the stub axle and carried by the end of the arm 3 is fast at its lower portion with a shoe 6 on which is fixed, by means of bolts 8 forming stirrups, the suspension spring which is composed of single superposed leaves 7 whose ends bear against the lower face of abutments 9, 10, which are carried by the chassis without being in any way connected to the chassis by spring shackles or the like. The abutments 9, 10, which have a gradual predetermined profile, enable a variable flexibility in the spring. Articulated to the upper portion of the collar $3^1$ is an assembly 11 shown only in Fig. 1, for limiting play which is composed of a rod 12 of variable length and a rubber abutment 13 adapted to bear against a support 14 fixed on the body of the vehicle.

Where appropriate, a torsion bar 15 shown in Fig. 2, can connect together the arms 3 at the two sides of the chassis and act as a stabilising bar in the event of lurching movement.

It will be noted that the arm 3 supporting the wheel stub axle 2 is so fixed on the chassis that its axis of articulation is situated rearwardly of the center of the wheel in relation to the vehicle running direction, indicated by arrow A, and at the same time lower than the said center, so that all the tangents such as ox to sections of the arc of swing of the center of the wheel, said sections being delimited by the positions of the spring at the ends of its bending travel, intersect the ground forwardly of the vertical line o—y passing through the center of the wheel.

These features of the arrangement of the suspension members afford the following advantages:

(1) The center of the wheel recoils relatively to the vehicle when the wheel rises, and vice versa;

(2) Owing to the rotation, the effective length of the arm 3 varies and the flexibility of the system increases when the inclination of the arm relatively to the horizontal decreases;

(3) The device described reduces the vertical movements of the wheel and consequently the accelerations thereof, thus diminishing the shocks transmitted to the body;

(4) The variable-flexibility progressive suspension obtained by the use of the springs 7 and abutments 9 and 10 also modifies at each instant the oscillatory characteristics of the system which has been described;

(5) The grip of the tire on the ground varies as a function of the relative displacement of the wheel relatively to the vehicle.

The resultants of the effects obtained by the features listed in 1, 2, 3, 4, 5 have the effect of damping the vibrations of the wheel-axle assembly.

It should also be mentioned that the suspension which has been described can equally well be applied to a rear suspension having independently suspended wheels as in the case illustrated in the drawings, or to a driving axle having independently suspended wheels in the case of a suspended rear axle unit, or to a driving axle in a non-suspended banjo-type rear axle unit.

The inconsiderable bulk of the arms and spring allows the provision of a wide body entrance.

The suspension which has been described promotes the lowering of the center of gravity of a vehicle body mounted on rectilinear side-members.

In an alternative embodiment, the point of articulation of the arm supporting the wheel can be situated forwardly of the wheel center but above the center thereof, in such manner that the tangents to sections of the arc of swing of the wheel center intersect the ground forwardly of the vertical line passing through the same center.

The same result is obtained as in the preceding arrangement, i.e. a shock-absorbing effect.

Figure 4:
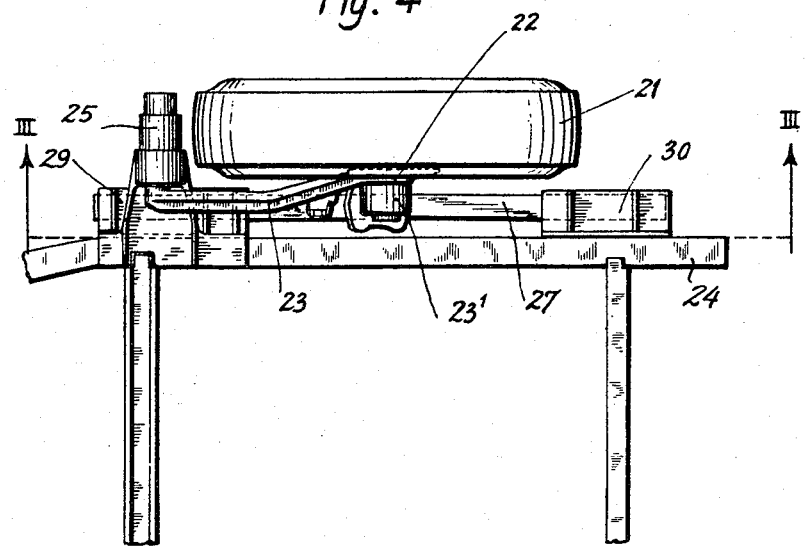
Fig. 4 is a half plan view corresponding to Fig. 3 in which a shock absorber in Fig. 3 is not shown.

One constructional form based on this modified embodiment is shown in Figs. 3 and 4. According to this arrangement the stub axle 22 supporting the wheel 21 is fixed at the end of an arm 23 which is articulated about a pin 25 situated forwardly of the wheel (the front of the vehicle being in the direction of the arrow A) and above the chassis 24 shown in broken lines in Fig. 3, and the center O of the stub axle. As in the case of the construction described hereinbefore, the arm 23 carries, by means of a collar 23' and a shoe 26, the leaf spring 27 whose ends bear against the lower faces of abutments 29, 30 of appropriate configuration carried by the chassis 24. A shock-absorber 36, fixed at one end to a support 34 on the vehicle, and at the other end to a pin 37 on the arm 23, contributes to reducing the shocks transmitted to the vehicle.

Besides the advantages enumerated hereinbefore, this embodiment affords the important advantage that, at the instant of braking, it produces a torque which compresses the spring and consequently tends to keep down the rear part of the vehicle and thus to act in opposition to any lifting of the rear wheels relatively to the ground.

It will readily be appreciated that, if the load on the chassis is increased, the points at which the springs bear against the abutments 29, 30 approach the center, thus reducing flexibility, and that downward movement of the chassis 24 causes similar movement of the pin 25 relatively to the center O, so that the latter moves upwards through the arc of travel shown at 38. As has been stated, the arrangement is such that the tangent o—x to this arc 38 remains forward, with respect to the normal direction of travel of the vehicle, of the vertical line o—y. Reduction of the load causes the pin 25 to move upwards again relatively to the axis o, increasing the flexibility of the spring and causing the center o to move downwards along its arc of swinging 38, and in this case the tangent o—x tends to move forwardly of the vertical line o—y.

It should be noted that in extreme cases with regard to load and play, it would be possible for the tangent o—x to come slightly rearwardly of the vertical line o—y; it must be understood that this case is also included within the scope of the invention; although the latter relates more particularly to devices wherein the tangent o—x remains constantly in front of the vertical line o—y, it also covers those wherein the said tangent, during one part of the bending travel of the spring, would be made to intersect the ground rearwardly of the vertical line o—y.

I claim:

1. In a suspension arrangement for the rear wheels of a vehicle capable of traveling mainly in one direction and having a frame, a body and opposite rear wheels, in combination, suspension assemblies for the opposite rear wheels, each assembly comprising a lever arm pivotally mounted on said frame and extending generally in a direction corresponding to the longitudinal direction of the frame, means providing a pivot for said lever arm at a point above lower side of said frame, axle means for rotatably mounting a rear wheel on the free end portion of said lever arm, two spaced abutments disposed on said frame and having underside bearing surfaces, a spring hanger mounted depending downwardly on the free end portion of the lever arm, a leaf spring having a center portion carried by said hanger and opposite end portions bearing on said underside surfaces of the abutments, the free end portion of the lever arm being disposed above the level of the spring whereby the axis of rotation of the wheel is constantly above the level of the spring, and a shock absorber connected to the body and to said lever arm adjacent said axle means for limiting angular movement of the free end of the lever and disposed to act in a plane substantially tangential to an arcuate path of travel of the axis the abutment disposed in direction corresponding to the direction in which the vehicle generally travels having its bearing surfaces higher from the road surfaces than the other abutment.

2. In a suspension arrangement for the rear wheels of a vehicle capable of traveling mainly in one direction and having a frame, a body and opposite rear wheels, in combination, suspension assemblies for the opposite rear wheels, each assembly comprising a lever arm pivotally mounted on said frame and extending generally in a direction corresponding to the longitudinal direction of the frame, means extending upwardly from the frame providing a pivot for said lever arm at a point above said frame, means for rotatably mounting a rear wheel on the free end portion of said lever arm, the pivot of said arm being disposed at a point higher than the axis of rotation of said wheel, two spaced abutments, disposed on said frame and having underside bearing surfaces, a spring hanger mounted on the free end portion of the lever arm, a leaf spring having a center portion carried by said hanger and opposite end portions bearing on said underside surfaces of the abutments, the free end portion of the lever arm being disposed above the level of the spring whereby the axis of rotation of the wheel is constantly above the level of the spring, a shock absorber connected to said lever arm and to the body, and the abutments being mounted in the same longitudinal plane in opposite directions from the axis of rotation of the wheel.

3. In a suspension arrangement for the rear wheels of a vehicle capable of traveling mainly in one direction and having a frame, a body and opposite rear wheels, in combination, suspension assemblies for the opposite rear wheels, each assembly comprising a lever arm pivotally mounted on said frame and extending generally in a direction corresponding to the longitudinal direction of the frame, means providing a pivot for said lever arm at a point above the lower side of said frame, means for rotatably mounting a rear wheel on the free end portion of said lever arm two spaced abutments disposed on said frame and having underside bearing surfaces, a spring hanger mounted on the free end portion of the lever arm, a leaf spring having a center portion carried by said hanger and opposite end portions bearing on said underside surfaces of the abutments, the free end portion of the lever arm being disposed above the level of the spring whereby the axis of rotation of the wheel is constantly above the level of the spring, a shock absorber connected to said lever arm adjacent to said rear wheel axis of rotation and to the body and a torsion bar extending between the pivots of the lever arms of the suspension assemblies of opposite rear wheels and interconnecting said lever arms.

References Cited in the file of this patent

UNITED STATES PATENTS

| | | |
|---|---|---|
| 1,767,987 | Johnston | June 24, 1930 |
| 2,011,239 | Christman | Aug. 13, 1935 |
| 2,085,662 | Johnson | June 29, 1937 |
| 2,191,941 | Reid | Feb. 27, 1940 |
| 2,222,377 | Slack | Nov. 19, 1940 |
| 2,254,287 | Heftler | Sept. 2, 1941 |
| 2,626,144 | Stephen | Jan. 20, 1953 |

FOREIGN PATENTS

| | | |
|---|---|---|
| 642,882 | Great Britain | Sept. 13, 1950 |